(12) United States Patent
Ng et al.

(10) Patent No.: US 9,092,211 B2
(45) Date of Patent: Jul. 28, 2015

(54) SOCIAL-BASED INFORMATION RECOMMENDATION SYSTEM

(71) Applicant: Microsoft Corporation, Redmond, WA (US)

(72) Inventors: Karen Ng, Bellevue, WA (US); Lorianne Lamkin, Issaquah, WA (US); Stephen H. Toub, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 13/714,187

(22) Filed: Dec. 13, 2012

(65) Prior Publication Data

US 2014/0173555 A1    Jun. 19, 2014

(51) Int. Cl.
G06F 9/44    (2006.01)

(52) U.S. Cl.
CPC .......................................... *G06F 8/30* (2013.01)

(58) Field of Classification Search
CPC ............... G06F 8/30; G06F 8/33; G06F 8/34; G06Q 50/01
USPC ............................ 717/106–113, 122; 705/319
See application file for complete search history.

(56) References Cited

U.S. PATENT DOCUMENTS

| | | | |
|---|---|---|---|
| 6,996,805 B2 | 2/2006 | Achlioptas et al. | |
| 7,827,122 B1* | 11/2010 | Campbell et al. | 706/12 |
| 8,554,635 B2* | 10/2013 | England et al. | 705/26.1 |
| 8,572,129 B1* | 10/2013 | Lee et al. | 707/798 |
| 8,595,696 B2* | 11/2013 | Maximilien et al. | 717/110 |
| 8,751,521 B2* | 6/2014 | Lee et al. | 707/767 |
| 2004/0117761 A1* | 6/2004 | Andrews et al. | 717/101 |
| 2005/0223354 A1* | 10/2005 | Drissi et al. | 717/114 |
| 2007/0169027 A1* | 7/2007 | Drepper | 717/140 |
| 2009/0049525 A1 | 2/2009 | D'Angelo et al. | |
| 2009/0125891 A1* | 5/2009 | Garimella et al. | 717/131 |
| 2009/0228296 A1* | 9/2009 | Ismalon | 705/1 |
| 2009/0313609 A1* | 12/2009 | Ackerman et al. | 717/127 |
| 2009/0319436 A1* | 12/2009 | Andra et al. | 705/80 |
| 2010/0083222 A1* | 4/2010 | Maximilien et al. | 717/110 |
| 2010/0228614 A1* | 9/2010 | Zhang et al. | 705/14.16 |
| 2010/0299305 A1* | 11/2010 | Laxman et al. | 707/609 |
| 2011/0004831 A1* | 1/2011 | Steinberg et al. | 715/753 |
| 2011/0184960 A1* | 7/2011 | Delpha et al. | 707/754 |
| 2011/0209133 A1 | 8/2011 | Mahajan et al. | |

(Continued)

OTHER PUBLICATIONS

Holmes et al., "Using Structural Context to Recommend Source Code Examples," May 2005, ACM, p. 117-125.*

(Continued)

*Primary Examiner* — Qing Chen
(74) *Attorney, Agent, or Firm* — Ben Tabor; Kate Drakos; Micky Minhas (57) ABSTRACT

Techniques are described herein that are capable of recommending information that is contextually related to code using a social data graph. A machine learning technique is used to determine that the information is contextually related to the code. A social data graph is a graph database that stores information associated with users in a social networking environment. For instance, such information may be retrieved from user profiles, social updates, etc. of the users. A social networking environment is an online service, platform, or domain (e.g., Web site) that facilitates the building of social networks (e.g., social relations) among people who share interests, activities, backgrounds, real-life connections, etc.

20 Claims, 6 Drawing Sheets

(56) References Cited

U.S. PATENT DOCUMENTS

| | | | |
|---|---|---|---|
| 2011/0270774 A1 | 11/2011 | Varshavsky et al. | |
| 2011/0276631 A1* | 11/2011 | Schmitt | 709/205 |
| 2012/0174061 A1* | 7/2012 | McCollum et al. | 717/106 |
| 2012/0179751 A1* | 7/2012 | Ahn et al. | 709/204 |
| 2012/0272207 A1 | 10/2012 | Lerner et al. | |
| 2012/0290433 A1* | 11/2012 | England et al. | 705/26.7 |
| 2012/0290446 A1* | 11/2012 | England et al. | 705/27.1 |
| 2013/0041916 A1* | 2/2013 | Biesecker et al. | 707/769 |
| 2013/0191372 A1* | 7/2013 | Lee et al. | 707/722 |
| 2013/0297698 A1* | 11/2013 | Odero et al. | 709/204 |
| 2014/0047413 A1* | 2/2014 | Sheive et al. | 717/110 |
| 2014/0137072 A1* | 5/2014 | Hey et al. | 717/101 |

OTHER PUBLICATIONS

Seth et al., "A Social Network Based Approach to Personalized Recommendation of Participatory Media Content," 2008, Association for the Advancement of Artificial Intelligence, p. 109-117.*

De Pessemier et al., "Context Aware Recommendations for User-generated Content on a Social Network Site," Jun. 2009, ACM, p. 133-136.*

Guy et al., "Personalized Recommendation of Social Software Items Based on Social Relations," Oct. 2009, ACM, p. 53-60.*

Jiang et al., "Social Contextual Recommendation," Oct. 2012, ACM, p. 45-54.*

"International Search Report & Written Opinion for PCT Patent Application No. PCT/US2013/074961", Mailed Date: Jul. 22, 2014, Filed Date: Dec. 13, 2013, 13 Pages.

Robillard, et al., "Recommendation Systems for Software Engineering", In IEEE Software, vol. 27, Issue 4, Jul. 2010, pp. 80-86.

Ankolekar, et al., "Supporting Online Problem-Solving Communities with the Semantic Web", In Proceedings of the 15th international conference on World Wide Web, May 23, 2006, pp. 575-584.

Zagalsky, et al., "Example Overflow: Using Social Media for Code Recommendation", In Third International Workshop on Recommendation Systems for Software Engineering, Jun. 4, 2012, pp. 38-42.

Perez, Sarah., "Viximo Goes after Mobile Game Developers with Launch of Social Zone", Retrieved at <<http://techcrunch.com/2012/03/01/viximo-goes-after-mobile-game-developers-with-launch-of-socialzone/>>, Mar. 1, 2012, 2 Pages.

Wu, et al., "DREX: Developer Recommendation with K-Nearest-Neighbor Search and Expertise Ranking", Retrieved at <<http://ieeexplore.ieee.org/stamp/stamp.jsp?tp=&arnumber=6130646>>, Proceedings of the Software Engineering Conference (APSEC), 2011 18th Asia Pacific, Dec. 5, 2011, pp. 389-396.

Bertram, et al., "Communication, Collaboration, and Bugs: The Social Nature of Issue Tracking in Small, Collocated Teams", Retrieved at <<http://research.microsoft.com/en-us/um/redmond/groups/connect/cscw_10/docs/p291.pdf>>, Feb. 6, 2010, pp. 291-300.

Amer-Yahia, et al., "Building Community-Centric Information Exploration Applications on Social Content Sites", Retrieved at <<http://www.google.com/url?sa=t&rct=j&q=Building+Community-Centric+Information+Exploration+Applications+on+Social+Content+Sites&source=web&cd=2&ved=0CF4QFjAB&url=http%3A%2F%2Fresearch.yahoo.net%2Ffiles%2Fsigmod09-jelly.pdf&ei=wIONT_rkLoTorQei9vHICQ&usg=AFQjCNEIPaa9tlTGkgSy215fp4hyTxoBDA>>, Proceedings of the SIGMOD, 2009, pp. 1-6.

* cited by examiner

SOCIAL-BASED INFORMATION RECOMMENDATION SYSTEM

BACKGROUND

Software developers continue to seek more efficient and effective techniques for developing software (a.k.a. "code"). For instance, software developers often use developer tools to facilitate the development of their software. Such developer tools may perform diagnostic operations (e.g., identifying source of problem, debugging, profiling, controlling, etc.) with respect to the software that is being developed. Examples of a developer tool include but are not limited to a web development platform (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.).

With the increased availability and usage of open source software and other scaffolding solutions, developers have begun to seek "grab-and-go" solutions in which pieces of pre-developed code may be assembled to reduce an amount of time that the developers take to develop their software. However, conventional "grab-and-go" solutions typically provide static lists on websites or in developer tools that advertise available libraries and controls. In the case of conventional open source "grab-and-go" solutions, a repository may be available via the Web, such that the repository may be browsed via a Web interface to explore code for copy-and-paste and/or files that are available for download or to obtain a local copy of the repository via download or via a distributed version control system.

SUMMARY

Various approaches are described herein for, among other things, recommending information that is contextually related to code using a social data graph. A machine learning technique is used to determine that the information is contextually related to the code. Examples of a machine learning technique include but are not limited to a neural network, a support vector machine, etc. A social data graph is a graph database that stores information associated with users in a social networking environment. For instance, such information may be retrieved and/or inferred from user profiles, social updates, etc. of the users. A social networking environment is an online service, platform, or domain (e.g., Web site) that facilitates the building of social networks (e.g., social relations) among people who share interests, activities, backgrounds, real-life connections, etc. Examples of a social networking environment include but are not limited to Badoo®, Bebo®, Facebook®, Yammer®, Google+®, Linkedin®, Myspace®, Orkut®, Renren™, Twitter®, Vkontakte™, Microsoft Team Foundation Server™, etc.

An example method is described in which a determination is made that a developer performs an operation with regard to development of designated code. Information that is contextually related to the designated code is determined using a machine learning technique. The information is associated with users in a social networking environment in a social data graph. At least a portion of the information is recommended for use with regard to the designated code based on at least the portion of the information being associated with at least one user who is included in a social network of the developer in the social data graph.

A system is described that includes operation determination logic, information determination logic, and recommendation logic. The operation determination logic is configured to determine whether a developer performs an operation with regard to development of designated code. The information determination logic is configured to determine information that is contextually related to the designated code using a machine learning technique. The information is associated with users in a social networking environment in a social data graph. The recommendation logic is configured to recommend at least a portion of the information for use with regard to the designated code based on at least the portion of the information being associated with at least one user who is included in a social network of the developer in the social data graph.

A computer program product is described that includes a computer-readable medium having computer program logic recorded thereon for enabling a processor-based system to recommend information that is contextually related to code using a social data graph. The computer program product includes a first program logic module, a second program logic module, and a third program logic module. The first program logic module is for enabling the processor-based system to determine whether a developer performs an operation with regard to development of designated code. The second program logic module is for enabling the processor-based system to determine information that is contextually related to the designated code using a machine learning technique. The information is associated with users in a social networking environment in a social data graph. The third program logic module is for enabling the processor-based system to recommend at least a portion of the information for use with regard to the designated code based on at least the portion of the information being associated with at least one user who is included in a social network of the developer in the social data graph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of recommending information that is contextually related to code using a social data graph. A machine learning technique is used to determine that the information is contextually related to the code. Examples of a machine learning technique include but are not limited to a neural network, a support vector machine, etc. A social data graph is a graph database that stores information associated with users in a social networking environment. For instance, such information may be retrieved from user profiles, social updates, etc. of the users. A social networking environment is an online service, platform, or domain (e.g., Web site) that facilitates the building of social networks (e.g., social relations) among people who share interests, activities, backgrounds, real-life connections, etc. Examples of a social networking environment include but are not limited to Badoo®, Bebo®, Facebook®, Google+®, Linkedin®, Myspace®, Orkut®, Renren™ Twitter®, Vkontakte™, etc.

Example techniques described herein have a variety of benefits as compared to conventional software development techniques. For instance, the example techniques are capable of using social relationships of a developer to recommend information that is contextually related to code that the developer is writing. Such information may help the developer find existing components to incorporate into the code, determine which reusable software to use, determine who to hire for a job, determine quality of available code snippets for use in the code, determine what people are doing with the code, make targeted marketing opportunities with consumers who use the code, etc. Utilizing contextual relationships may address discoverability issues that are associated with conventional techniques.

The example techniques are capable of leveraging developer-to-developer social relationships and developer-to-end-user social relationships. For instance, in developer-to-developer scenarios, a developer who is fixing code may be socially connected to previous owner(s) and/or check-in(s) of the code. The developer may leverage resumes, real contributions, and skills in the social data graph to determine who to hire to solve a technical problem. The developer may leverage reputations of users and code snippets that are written by the users, as provided in the social data graph, to find a person to fill a new developer position. Communications between developers regarding code are included in a history of the code that is included in the social data graph. Such history may be used to make inferences about the types of problems the developers are solving and the resources that the developers may use to solve those problems.

In developer-to-end-user scenarios, the social data graph provides access to information regarding quality of code and consumer feedback regarding the code. Such information may be used to make informed decisions about code reuse and future enhancements to the code. For instance, the information may indicate performance of the code, a number of bugs filed, profiling, hot spots, how many other people are actively using the code (and their feedback or opinions regarding the code). The example techniques may be used to attract new users to applications. For instance, social data graph may include information about which types of applications a user purchases. The example techniques may use preferences and/or demographics of the user, information regarding which applications are used by people in a social network of the user, etc. to recommend additional applications or open source to the user. For example, the user may be notified about a specified application because people in the social network of the user use the specified application.

The example techniques are capable of connecting data pertaining to source code control and check-ins to social relationships. The social data graph may include information beyond classic Source Configuration Management data. For instance, the social data graph may include data from conversations in Skype® and/or messaging services (e.g., email, short message service (SMS), instant message (IM), etc.); discovery patterns and/or usage patterns from technical forums, code sample galleries, and/or expert websites (e.g., www.stackoverflow.com); documents from any suitable local or cloud-based source, etc. Using the social data graph as described herein may provide a software development solution that is more efficient, performant, and/or scalable as compared to conventional techniques.

Figure 1:
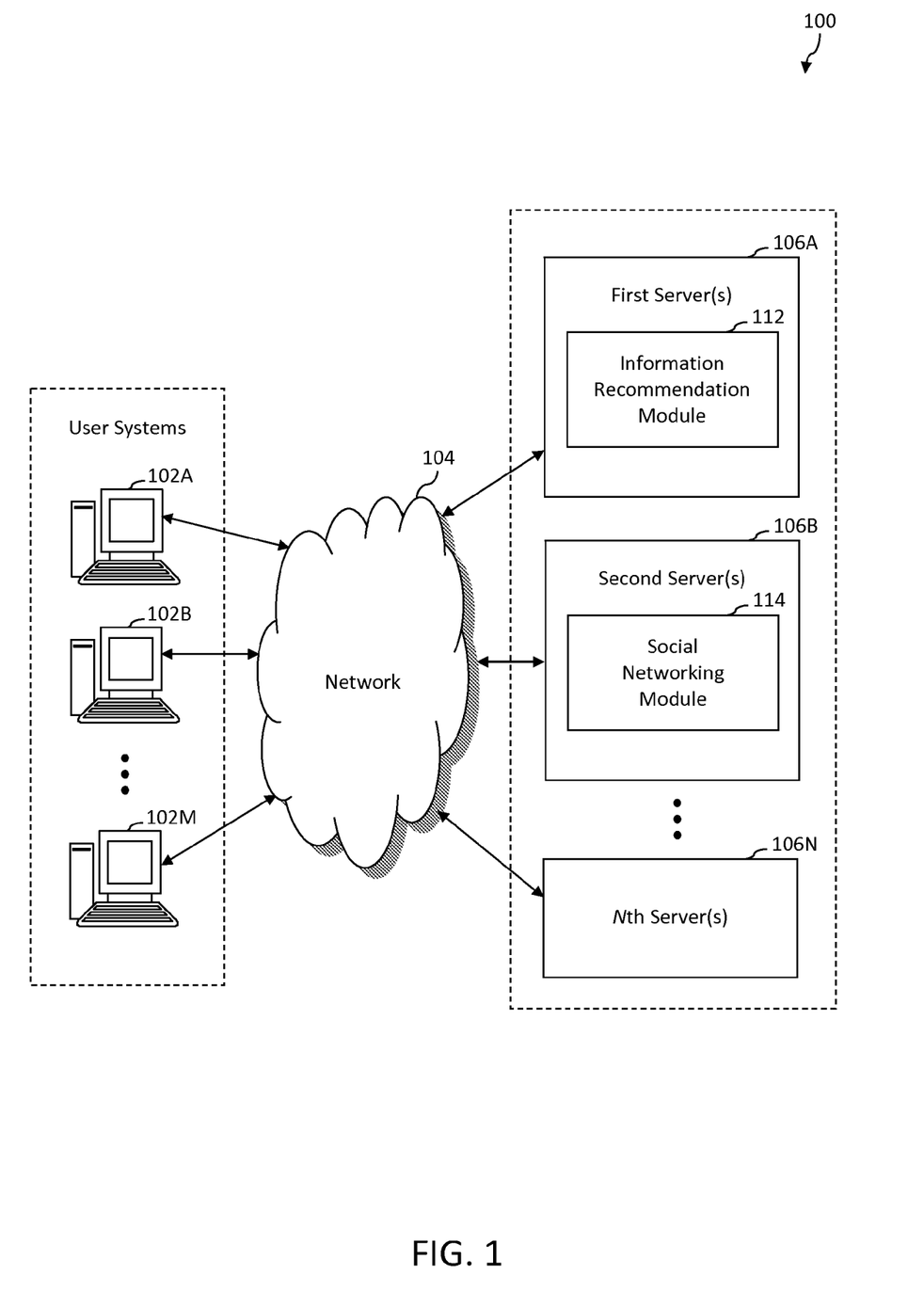
FIG. 1 is a block diagram of an example social-based information recommendation system in accordance with an embodiment.

FIG. 1 is a block diagram of an example social-based information recommendation system 100 in accordance with an embodiment. Generally speaking, social-based information recommendation system 100 operates to recommend information that is contextually related to code using a social data graph. As shown in FIG. 1, social-based information recommendation system 100 includes a plurality of user systems 102A-102M, a network 104, and a plurality of servers 106A-106N. Communication among user systems 102A-102M and servers 106A-106N is carried out over network 104 using well-known network communication protocols.

Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests (e.g., hypertext transfer protocol (HTTP) requests) to servers 106A-106N for requesting information stored on (or otherwise accessible via) servers 106A-106N.

For instance, a user (e.g., a developer) may initiate a request for such information using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domains may include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M. Servers 106A-106N are configured to execute computer programs (e.g., developer tools) that provide information to users in response to receiving requests from the users. For example, the information may include documents (e.g., Web pages, images, video files, etc.), output of executables, raw data, or any other suitable type of information. In accordance with some example embodiments, servers 106A-106N are configured to host respective Web sites, so that the Web sites are accessible to users of social-based information recommendation system 100.

First server 106A is shown to include an information recommendation module 112 for illustrative purposes. Information recommendation module 112 is configured to recommend information that is contextually related to code using a social data graph. For example, information recommendation module 112 is capable of determining that a developer performs an action with respect to the code. For instance, information recommendation module 112 may determine that the developer acquires ownership of the code (e.g., for purposes of writing the code or fixing a bug in the code), that the developer checks-in to the code (e.g., for purposes of fixing a bug that affects a feature of the code even though the developer is not necessarily fixing that feature), that the developer scrolls through and/or moves a cursor through and/or clicks within a method within the code, that the developer pauses on a method within the code for a period of time that reaches a threshold, etc. Upon determining that the developer performs the action, information recommendation module 112 may traverse a social data graph to determine information that is contextually related to the code. For instance, the social data graph may be configured to associate (e.g., define relationships between) such information and users in a social networking environment. The social data graph may be stored in the cloud, though the scope of the example embodiments is not limited in this respect.

Information recommendation module 112 may determine that some portion of the information that is contextually related to the code is associated with user(s) who are in a social network of the developer. Information recommendation module 112 may recommend that portion of the information to the developer for use with regard to the code. It will be recognized that information recommendation module 112 may recommend less than all of the aforementioned portion of the information, all of the aforementioned portion, other information in addition to the aforementioned portion, etc. For instance, such other information may include information synthesized from available data, based on machine learning, heuristics, analytics, etc. For example, assume for purposes of illustration that Alice and Bob have recently worked on code, and Alice and Bob are friends with Carl, whom the developer does not know but whose profile shows him to be knowledgeable in the type of code on which the developer is working. Information recommendation module 112 may recommend that the developer obtain a review of the code from Carl and may help automate the process of doing so. It will be further recognized that information recommendation module 112 may be (or may be included in) a developer tool. It will be further recognized that if someone in the future is searching for a person to provide a code review with regard to the code, information recommendation module 112 may recommend that the developer provide the requested code review based on knowledge that the developer has performed the previous action with respect to the code. Example techniques for recommending information that is contextually related to code using a social data graph are discussed in greater detail below with reference to FIGS. 2-6.

Second server 106B is shown to include social networking module 114 for illustrative purposes. Social networking module 114 is configured to provide a social networking environment and to facilitate the building of social networks among users in the social networking environment who share interests, activities, backgrounds, real-life connections, etc. For instance, each social network may include a respective subset of the users in the social environment. The subset of users in each social network may communicate using any of a variety of techniques, such as social updates. Each user may have a personal profile that includes information about the user and/or topics that are of interest to the user. Social networking module 114 may provide any such communications, personal profile information, and/or other information that is available in the social networking environment to information recommendation module 112 for analysis. For instance, social networking module 114 may provide such information to information recommendation module 112 (e.g., via an application programming interface (API)) for association with the corresponding user(s) in the social data graph, though it will be recognized that social networking module 114 may associate the information with the corresponding user(s) in the social data graph.

Information recommendation module 112 and social networking module 114 are shown to be included in separate servers (or respective groups of servers) in FIG. 1 for illustrative purposes and are not intended to be limiting. It will be recognized that information recommendation module 112 and social networking module 114 (or any respective portions thereof) may be included in a common server (or a common group of servers).

Information recommendation module 112 and/or social networking module 114 may be implemented in various ways to recommend information that is contextually related to code using a social data graph, including being implemented in hardware, software, firmware, or any combination thereof. For example, information recommendation module 112 and/or social networking module 114 may be implemented as computer program code configured to be executed in one or more processors. In another example, information recommendation module 112 and/or social networking module 114 may be implemented as hardware logic/electrical circuitry. In an embodiment, information recommendation module 112 and/or social networking module 114 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
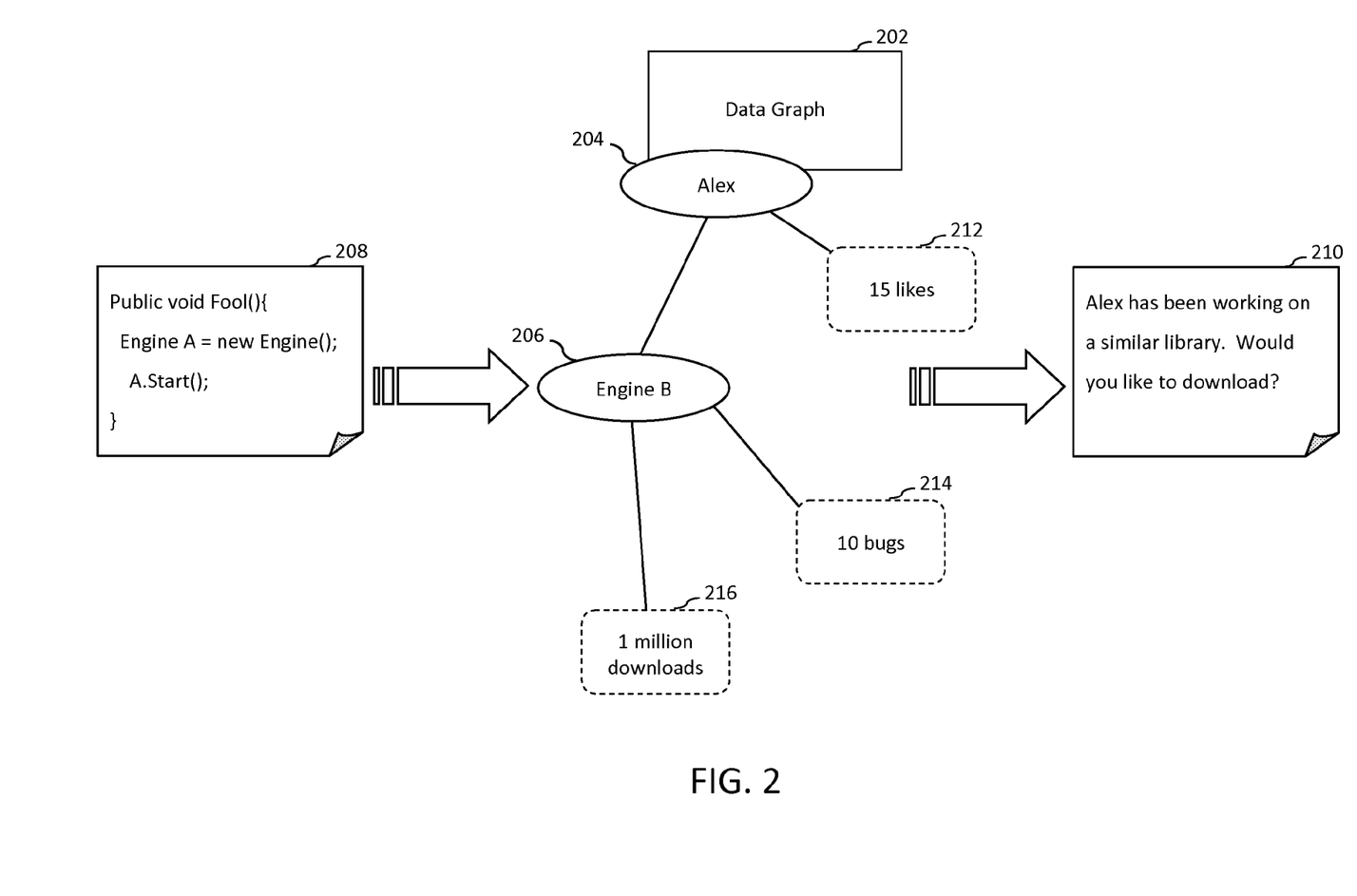
FIG. 2 is a diagram that illustrates an example implementation of a social-based information recommendation technique in accordance with an embodiment.

FIG. 2 is a diagram that illustrates an example implementation of a social-based information recommendation technique in accordance with an embodiment. As depicted in FIG. 2, a developer is drafting code 208. In particular, the developer is creating a new engine "Engine A" in a library. A social-based information recommendation system (e.g., social-based information recommendation system 100 of FIG. 1) determines that the developer is creating Engine A. In response to determining that the developer is creating a new engine, the social-based information recommendation system traverses data graph 202 to determine whether information is to be recommended to the developer with regard to Engine A.

Data graph 202 includes nodes 204 and 206 and properties 212, 214, and 216. Node 204 represents Alex, who is a user in a social network of the developer. Node 206 represents an engine "Engine B", which is written by Alex. Property 212 indicates that Alex has received fifteen "likes" from other users in the social network. Property 214 indicates that ten bugs have been fixed in Engine B. Property 216 indicates that Engine B has been downloaded one million times. It will be recognized that data graph 202 need not necessarily include all of the nodes 204 and 206 and the properties 212, 214, 216 shown in FIG. 2. Moreover, data graph 202 may include node(s) and/or properties) in addition to or in lieu of those described herein.

The social-based information recommendation system determines whether to recommend information that is included or referenced in data graph 202 for use with regard to Engine A based on criteria, such as whether the information is contextually related to Engine A, whether the provider of the information is in a social network of the developer, and/or other suitable criteria. In this example, the social-based information recommendation system determines that Engine B is contextually related to Engine A and that Alex is in a social network of the developer. Accordingly, the social-based information recommendation system recommends Engine B to the developer.

As mentioned above, the determination whether to recommend Engine B to the developer may be based on additional criteria. For instance, in this example, traversal of data graph 202 reveals that Alex has received fifteen "likes", that ten bugs have been fixed in Engine B, and that Engine B has been downloaded one million times. The aforementioned additional criteria may include whether a number of "likes" that Alex has is greater than a first threshold, whether the number of bugs that have been fixed in Engine B is less than a second threshold, whether the number of times that Engine B has been downloaded is greater than a third threshold, etc.

As shown in FIG. 2, the recommendation of Engine B to the developer is in the form of an inquiry 210 for illustrative purposes. The inquiry 210 indicates that Alex has been working on a library that is similar to the one in which the developer has begun to write Engine A, and the inquiry 210 asks whether the developer would like to download Alex's library, which includes Engine B. For instance, Alex's library may be downloaded so that the developer may replace Engine A with Engine B or so that the developer may use Engine B as a template for writing Engine A.

Figure 3:
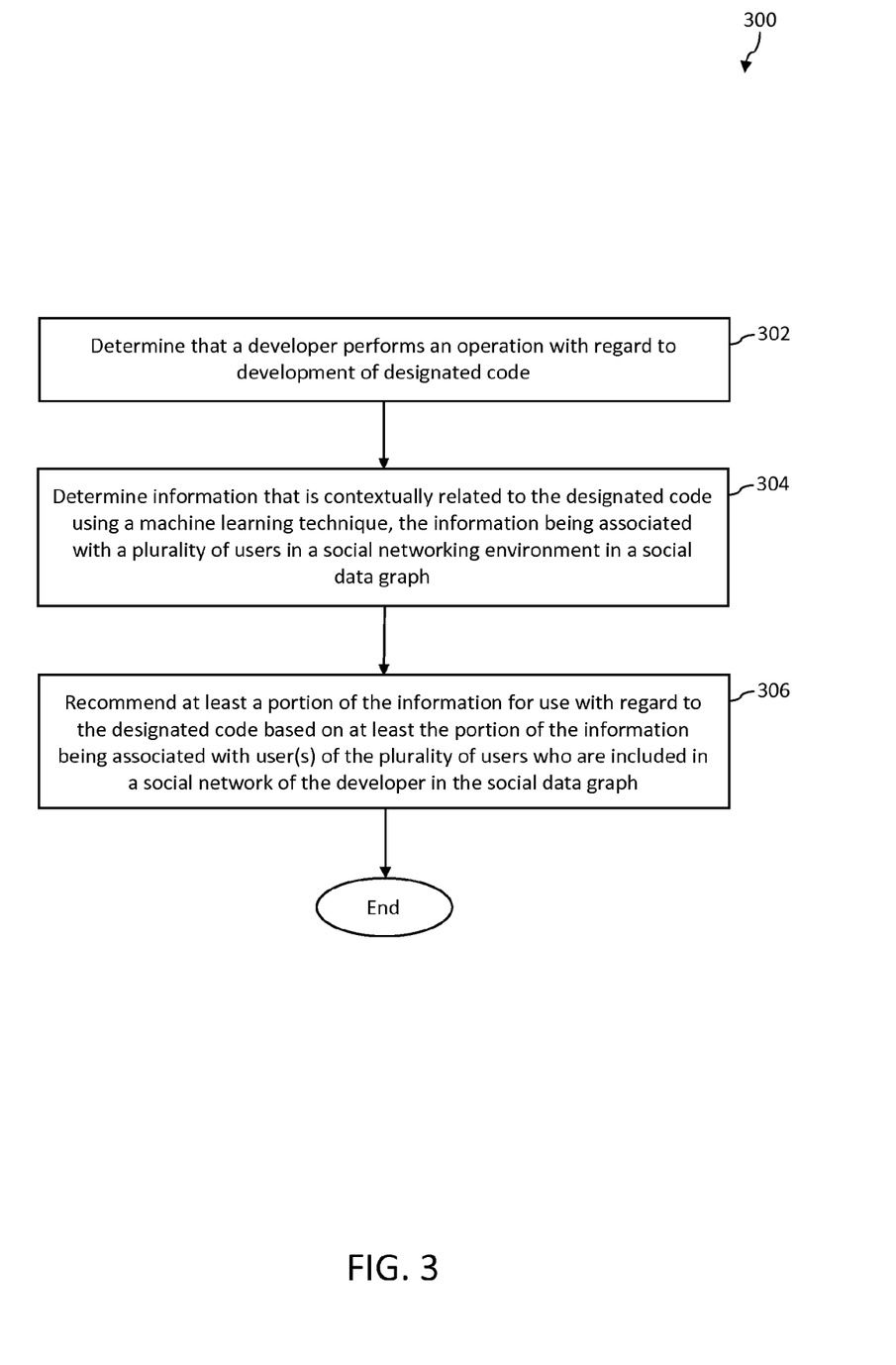
FIGS. 3 and 5 depict flowcharts of example methods for recommending information according to embodiments.
Figure 4:
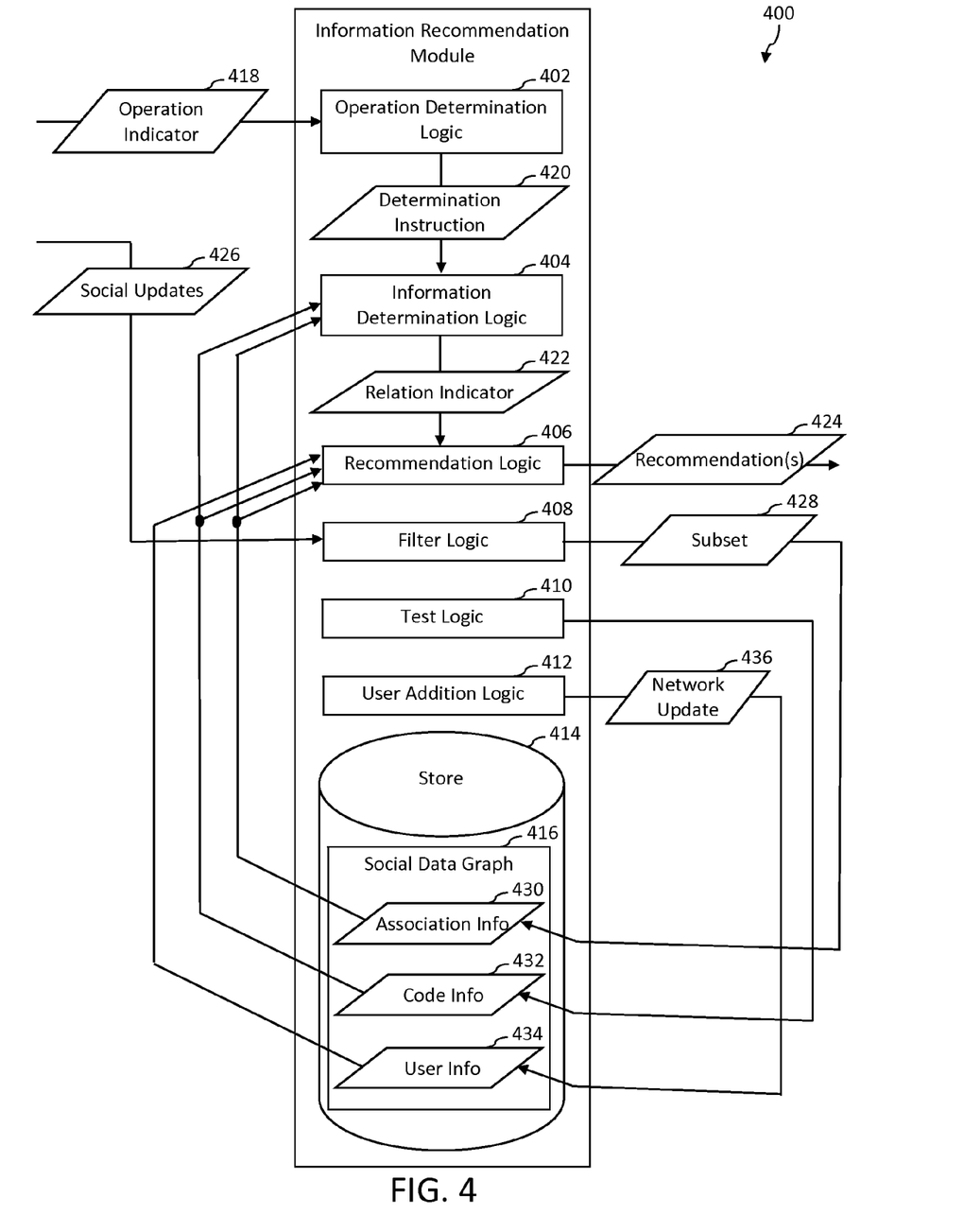
FIG. 4 is a block diagram of an example implementation of an information recommendation module shown in FIG. 1 in accordance with an embodiment.

FIG. 3 depicts a flowchart of an example method for recommending information according to an embodiment. Flowchart 300 may be performed by information recommendation module 112 of social-based information recommendation system 100 shown in FIG. 1, for example. For illustrative purposes, flowchart 300 is described with respect to information recommendation module 400 shown in FIG. 4, which is an example of information recommendation module 112, according to an embodiment. As shown in FIG. 4, information recommendation module 400 includes operation determination logic 402, information determination logic 404, recommendation logic 406, filter logic 408, test logic 410, user addition logic 412, and store 414. Store includes a social data graph 416. Further structural and operational embodiments will be apparent to persons skilled in the relevant art(s) based on the discussion regarding flowchart 300.

As shown in FIG. 3, the method of flowchart 300 begins at step 302. In step 302, a determination is made that a developer performs an operation with regard to development of designated code. The phrase "development of designated code" as used herein is intended to include any one or more of designing, coding, testing, etc. of the designated code. Examples of an operation that may be performed with regard to development of designated code include but are not limited to creating a coding project to contain the designated code (e.g., typing a name of the coding project in a development tool); obtaining information regarding a status and/or progress of the coding project; writing the designated code; testing the designated code; interacting with other person(s) (e.g., team members) regarding the designated code (e.g., a concept of the designated code, even before the designated code exists) using any suitable electronic communication technique (e.g., instant messaging (IM), persistent chat, Yammer®, Facebook®, etc.); searching for content and/or data to be incorporated into the designated code (e.g., making a call from the designated code to the content and/or data, placing the content (e.g., code snippet) in-line with the designated code); searching for person(s) to assist with the development (e.g., design, coding, testing, etc.) of the designated code; requesting feedback regarding the designated code; performing a search regarding an issue that is encountered with regard to the designated code (e.g., during writing, testing, building, and/or deploying the designated code); composing an architectural diagram (e.g., an architectural component diagram, an architectural class diagram, etc.), data flow diagram, sequence diagram, use case diagram, etc. with regard to the designated code (e.g., even before the designated code exists); creating and/or running a build of the designated code; responding to an issue regarding a test, a build, and/or deployment of the designated code; creating, updating, and/or closing a work item (e.g., an item in a "to-do" list) with regard to the designated code; performing ideation with regard to the designated code (e.g., introducing a concept of the designated code to determine subject matter to which the designated code is to be directed); creating and/or editing a story board, sketch, and/or design (e.g., user interface design) regarding the designated code (e.g., before the designated code is written); generating a report of work that is performed on the designated code (e.g., activities, changes, categorization of the nature of the work performed on the work in a specified time period, and so on); etc.

In an example implementation, operation determination logic 402 determines that the developer performs the operation. For instance, operation determination logic 402 may determine that the developer performs the operation in response to receipt of an operation indicator 418, which specifies that the operation is performed. Operation determination logic 402 may generate a determination instruction 420 in response to determining that the developer performs the operation. The determination instruction 420 instructs information determination logic 404 to determine information that is contextually related to the designated code.

In an example embodiment, step 302 includes determining that the developer acquires ownership of the designated code. For instance, the developer may acquire ownership to write the designated code or a portion thereof, to fix a bug in the designated code, etc.

In another example embodiment, step 320 includes determining that the developer checks-in to the designated code. For example, the developer may check-in to the code to fix a bug that affects a feature of the designated code, even though the developer is not fixing the feature. In accordance with this example, the developer may check-in to the code to change a string, a comment, or some other piece of the code while fixing the bug.

At step 304, information that is contextually related to the designated code is determined using a machine learning technique. For instance, the information may be determined in response to determining that the developer performs the operation. The information is associated with a plurality of users, which are included in a social networking environment, in a social data graph. The information may include code snippet(s), a SDK or Virtual Studio® extension (e.g., a Resharper product), a user's name (e.g., a recommendation of a user to work on the designated code), file(s) with regard to which an issue occurs (e.g., code file(s) external to the designated code that encounter a same performance issue as the designated code), search results based on subject matter for which users in the social network of the developer have performed operations, etc. In an example implementation, information determination logic 404 determines the information that is contextually related to the designated code. For instance, information determination logic 404 may determine the information that is contextually related to the designated code in response to receipt of the determination instruction 420. Information determination logic 404 may generate a relation indicator 422 to specify the information that is contextually related to the designated code.

At step 306, at least a portion of the information is recommended for use with regard to the designated code based on at least the portion of the information being associated with user(s) of the plurality of users who are included in a social network of the developer in the social data graph. In an example implementation, recommendation logic 406 recommends at least the portion of the information for use with regard to the designated code. For instance, recommendation logic 406 may recommend at least the portion of the information based on the relation indicator 422. Recommendation logic 406 may provide recommendation(s) 424 to specify at least the portion of the information that is recommended for use with regard to the designated code. It will be recognized that recommendation logic 406 may recommend at least the portion of the information further based on association information 430, code information 432, and/or user information 434, all of which are included in social data graph 416. Store 414 stores social data graph 416.

Association information 430 specifies which users in the social networking environment are associated with which information (or portion(s) thereof). For instance, a user may be associated with information in response to the user providing the information, in response to the user being mentioned in the information, in response to the information being provided to the user, in response to the user discussing the information (e.g., in a forum or in social update(s)), in response to the user sharing the information with another user, in response to the user accessing the information, in response to the user rating the information, etc. If the information includes code snippet(s), the user may be associated with the information in response to the user being a current owner or a former owner of the code snippet(s), in response to the user checking-in to the code snippet(s), in response to the user working on the code snippet(s), in response to the user retrieving (e.g., downloading, consuming, using, etc.) the code snippet(s), etc.

Code information 432 describes the designated code and code snippets that are available to be recommended for use with regard to the designated code. For example, the code information 432 may specify a number of bugs in the designated code and/or in any one or more of the code snippets, a number of times any one or more of the code snippets is downloaded (e.g., by users in the social networking environment or in social network(s) of the developer), an indication of dependencies in the designated code and/or in any one or more of the code snippets (e.g., erroneous dependencies, which are capable of breaking the designated code and/or any one or more of the code snippets), a history of the designated code and/or any one or more of the code snippets, etc. In accordance with this example, the code information 432 may correlate a history of the designated code and/or any one or more of the code snippets with performance data, regression data, and/or other data that is associated with the designated code and/or any one or more of the code snippets.

User information 434 describes the users in the social networking environment. For instance, the user information 434 may specify whether each user in the social networking environment is included in social network(s) of the developer (and if so, in which of the social network(s) the user is included), rating(s) of each user (e.g., overall and/or in specified categories of subject matter), skill(s) of each user, duration of experience of each user with regard to software development and/or specified aspect(s) of software development, etc.

In an example embodiment, step 304 includes determining one or more code snippets of a plurality of code snippets that are contextually related to the designated code using the machine learning technique. For instance, information determination module 404 determines the one or more code snippets. Any one or more of the plurality of code snippets may be an open source code snippet, though the scope of the example embodiments is not limited in this respect. In accordance with this embodiment, the plurality of code snippets is associated with the plurality of users in the social data graph. In further accordance with this embodiment, step 306 includes recommending at least one code snippet of the one or more code snippets for inclusion in the designated code based on the at least one code snippet being associated with the user(s) who are included in the social network of the developer in the social data graph. For instance, recommendation logic 406 may recommend the at least one code snippet.

In an aspect of this embodiment, step 306 may include recommending a specified code snippet for inclusion in the designated code further based on skill(s) of a user who provides the specified code snippet. For example, the skill(s) of the user may be derived from a resume of the user who provides the specified code snippet. In an example implementation, recommendation logic 406 recommends the specified code snippet. The user information 434 may specify the skill(s) of the user. In accordance with this implementation, recommendation logic 406 may recommend the specified code snippet in response to receipt of the user information 434.

It will be recognized that, alternatively, recommendation logic 406 may recommend that the specified code snippet not be used in response to receipt of the user information 434. For instance, if the developer uses a code snippet that comes from a user who has a relatively low reputation, the developer may want to reconsider using that snippet, write more unit tests that cover the code snippet, get an extra code review on code of the developer that uses the code snippet, etc. If the developer ultimately uses the code snippet without needing to change it at all, then this occurrence may positively influence the reputation of the user from whom the code snippet came.

In another aspect of this embodiment, step 306 may include recommending a specified code snippet for inclusion in the designated code further based on a reputation of a user who provides the specified code snippet within the social network of the developer. For example, the reputation of the user may be based on a number of questions regarding software development that are answered by the user. In another example, the reputation of the user may be assigned by other users who are in a social network of the developer. In accordance with this example, the reputation may be based on a number of approvals (e.g., "likes") that the user receives for answers that the user has provided to questions regarding software development. For instance, the reputation may be based on a number of such approvals that the user receives from the providers of the respective questions. In yet another example, the reputation of the user may be imported in the social network of the developer from another social network or social networking environment (e.g., Stack Overflow™) The user information 434 may specify the reputation of the user.

In yet another aspect of this embodiment, step 306 may include recommending a specified code snippet for inclusion in the designated code further based on a number of bugs that are discovered in the specified code snippet. For example, recommending the at least one code snippet may be performed in response to the number of bugs that are discovered in the specified code snippet being less than a first threshold. In another example, the code information 432 may specify the number of bugs that are discovered in the specified code snippet and/or that the number of bugs is less than the first threshold.

In accordance with this aspect, step 306 may include recommending that an identified code snippet not be included in the designated code based on a number of bugs that are discovered in the identified code snippet reaching a second threshold (e.g., being greater than the second threshold, or being greater than or equal to the second threshold). For example, recommending the at least one code snippet may be performed in response to a determination that the identified code snippet is not to be included in the designated code. In another example, the code information 432 may specify the number of bugs that are discovered in the identified code snippet and/or that the number of bugs that are discovered in the identified code snippet reaches the second threshold.

In still another aspect of this embodiment, step 306 may include recommending a specified code snippet for inclusion in the designated code further based on a number of instances of the specified code snippet that are retrieved (e.g., downloaded, consumed, used, etc.) by users (e.g., in the social networking environment or in the social network of the developer). For instance, the code information 432 may specify the number of instances of the specified code snippet that are retrieved by the users.

In another aspect of this embodiment, step 306 may include recommending a specified code snippet for inclusion in the designated code further based on user feedback from user(s) who retrieve the specified code snippet. For instance, the code information 432 and/or the user information 434 may include the user feedback.

In yet another aspect of this embodiment, step 306 may include recommending a specified code snippet for inclusion in the designated code further based on retrieval of the specified code snippet by user(s) in the social network of the developer. For instance, such recommendation may be based on a number of users in the social network of the developer who retrieve the specified code snippet, an extent to which the specified code snippet is used by users in the social network of the developer, etc.

In another aspect, if the developer has written code that is similar to open source code on several occasions, a notice may be provided to a requestor of a code review, specifying that the reviewer has a propensity for looking at open source code, if the developer provides the requested code review.

Figure 5:
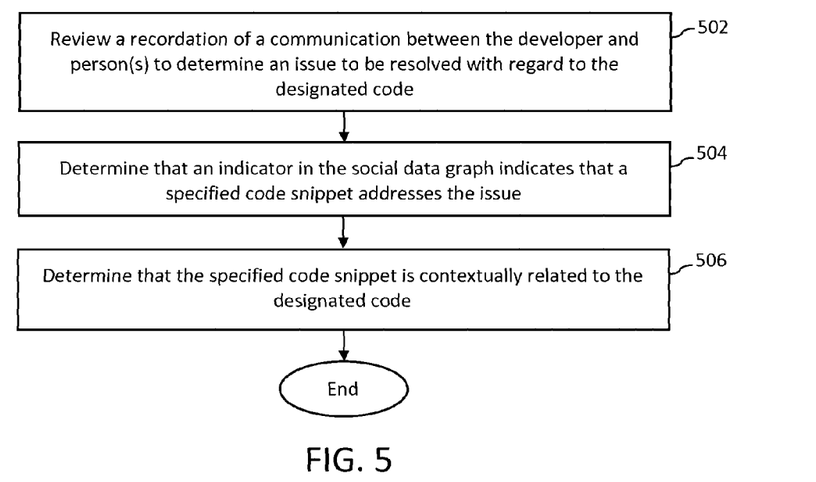
Figure 6:
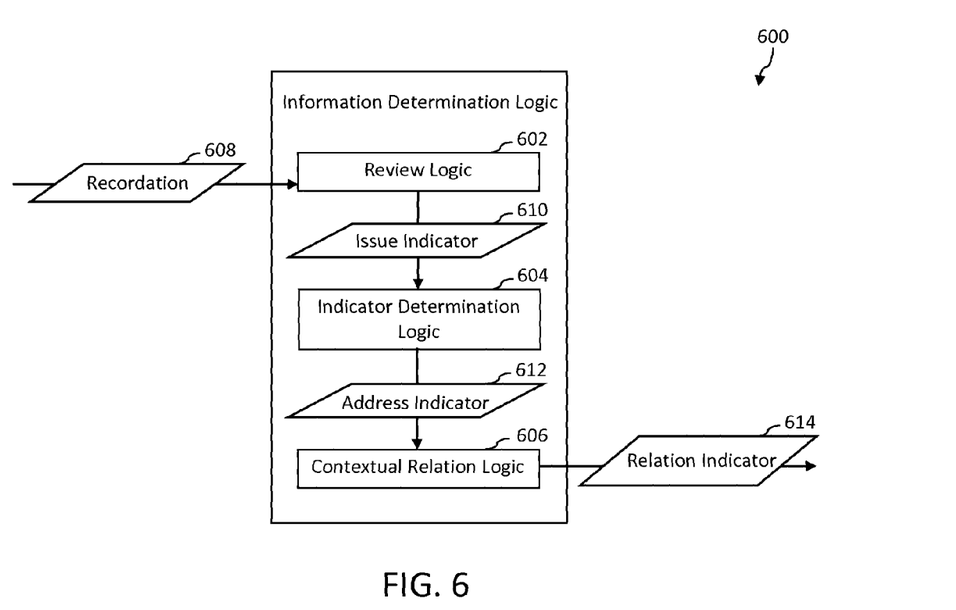
FIG. 6 is a block diagram of an example implementation of information determination logic shown in FIG. 4 in accordance with an embodiment.

In still another aspect of this embodiment, step 304 may include the steps shown in flowchart 500 of FIG. 5. Flowchart 500 may be performed by information determination logic 404 shown in FIG. 4, for example. For illustrative purposes, flowchart 500 is described with respect to information determination logic 600 shown in FIG. 6, which is an example of information recommendation module 112, according to an embodiment. As shown in FIG. 6, information determination logic 600 includes review logic 602, indicator determination logic 604, and contextual relation logic 606. Further structural and operational embodiments will be apparent to persons skilled in the relevant art(s) based on the discussion regarding flowchart 500.

As shown in FIG. 5, the method of flowchart 500 begins at step 502. In step 502, a recordation of a communication between the developer and person(s) is reviewed to determine an issue to be resolved with regard to the designated code. Examples of a recordation include but are not limited to a textual record (e.g., email, short message service (SMS), instant message (IM), etc.), an audio record, a video record (e.g., a Skype® record), etc. In an example implementation, review logic 602 reviews recordation 608 to determine the issue. In accordance with this implementation, review logic 602 may generate issue indicator 610, which specifies the issue to be resolved with regard to the designated code.

At step 504, a determination is made that an indicator in the social data graph indicates that a specified code snippet addresses (e.g., resolves) the issue. In an example implementation, indicator determination logic 604 determines that the indicator in the social graph indicates that the specified code snippet addresses the issue. For instance, code information 432 may include the indicator in social data graph 416. In accordance with this implementation, indicator determination logic 604 may make the determination in response to receipt of the issue indicator 610. Indicator determination logic 604 may generate an address indicator 612, which indicates that the specified code snippet addresses the issue.

At step 506, a determination is made that the specified code snippet is contextually related to the designated code. For instance, the determination may be made based on the indicator. In an example implementation, contextual relation logic 606 determines that the specified code snippet is contextually related to the designated code. For instance, contextual relation logic 606 may make the determination in response to receipt of the address indicator 612. Contextual relation logic 606 may generate a relation indicator 614, which indicates that the specified code snippet is contextually related to the designated code.

In some example embodiments, one or more steps 502, 504, and/or 506 of flowchart 500 may not be performed. Moreover, steps in addition to or in lieu of steps 502, 504, and/or 506 may be performed.

It will be recognized that information determination logic 600 may not include one or more of review logic 602, indicator determination logic 604, and/or contextual relation logic 606. Furthermore, information determination logic 600 may include logic in addition to or in lieu of review logic 602, indicator determination logic 604, and/or contextual relation logic 606.

Referring back to FIG. 3, in some example embodiments, one or more steps 302, 304, and/or 306 of flowchart 300 may not be performed. Moreover, steps in addition to or in lieu of steps 302, 304, and/or 306 may be performed. For instance, in an example embodiment, the information includes code snippet(s), and the method of flowchart 300 further includes performing test(s) with regard to the code snippet(s) to generate performance information that describes performance of the code snippet(s) with regard to the test(s). In accordance with this embodiment, step 306 includes recommending at least one of the code snippet(s) for inclusion in the designated code further based on the performance information.

In another example embodiment, the information includes code snippet(s), and the method of flowchart 300 further includes recommending additional code snippet(s) to the developer based on retrieval of the additional code snippet(s) by user(s) in the social network of the developer.

In yet another example embodiment, the method of flowchart 300 further includes filtering social updates that are associated with the plurality of users to determine a subset of the social updates that relate to development of software applications. For instance, filter logic 408 may filter social updates 426 to determine a subset 428 of the social updates 426 that relate to development of software applications. In accordance with this embodiment, step 304 includes determining the information that is contextually related to the designated code based on the subset. For example, information determination logic 404 may determine the information based on the subset 428. In accordance with this example, an indication of the subset 428 may be included in the association information 430.

In still another example embodiment, the method of flowchart 300 further includes adding a previous owner of the designated code to the social network of the developer in response to determining that the developer performs the operation with regard to development of the designated code. In an example implementation, user addition logic 412 adds the previous owner of the designated code to the social network of the developer. User addition logic 412 may provide a network update 436 to the social data graph 416 to indicate in the user information 434 that the previous owner of the designated code is included in the social network of the developer.

In yet another embodiment, the method of flowchart 300 further includes adding user(s) who previously checked-in to the designated code to the social network of the developer in response to determining that the developer performs the operation with regard to development of the designated code. In an example implementation, user addition logic 412 adds the user(s) who previously checked-in to the designated code to the social network of the developer. User addition logic 412 may provide the network update 436 to the social data graph 416 to indicate in the user information 434 that the user(s) who previously checked-in to the designated code are included in the social network of the developer.

In still another example embodiment, the method of flowchart 300 further includes recommending code snippet(s) to the developer based on preference(s) and/or demographic characteristic(s) of the developer. For instance, recommendation logic 406 may recommend the code snippet(s) to the developer based on the preference(s) and/or the demographic characteristic(s) of the developer.

It will be recognized that information recommendation module 400 may not include one or more of operation determination logic 402, information determination logic 404, recommendation logic 406, filter logic 408, test logic 410, user addition logic 412, store 414, and/or social data graph 416. Furthermore, information recommendation module 400 may include modules in addition to or in lieu of operation determination logic 402, information determination logic 404, recommendation logic 406, filter logic 408, test logic 410, user addition logic 412, store 414, and/or social data graph 416.

Information recommendation module 112, social networking module 114, operation determination logic 402, information determination logic 404, recommendation logic 406, filter logic 408, test logic 410, user addition logic 412, store 414, social data graph 416, review logic 602, indicator determination logic 604, contextual relation logic 608, flowchart 300, and flowchart 500 may be implemented in hardware, software, firmware, or any combination thereof.

For example, information recommendation module 112, social networking module 114, operation determination logic 402, information determination logic 404, recommendation logic 406, filter logic 408, test logic 410, user addition logic 412, store 414, social data graph 416, review logic 602, indicator determination logic 604, contextual relation logic 608, flowchart 300, and/or flowchart 500 may be implemented as computer program code configured to be executed in one or more processors.

In another example, information recommendation module 112, social networking module 114, operation determination logic 402, information determination logic 404, recommendation logic 406, filter logic 408, test logic 410, user addition logic 412, store 414, social data graph 416, review logic 602, indicator determination logic 604, contextual relation logic 608, flowchart 300, and/or flowchart 500 may be implemented as hardware logic/electrical circuitry.

For instance, in an embodiment, one or more of information recommendation module 112, social networking module 114, operation determination logic 402, information determination logic 404, recommendation logic 406, filter logic 408, test logic 410, user addition logic 412, store 414, social data graph 416, review logic 602, indicator determination logic 604, contextual relation logic 608, flowchart 300, and/or flowchart 500 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
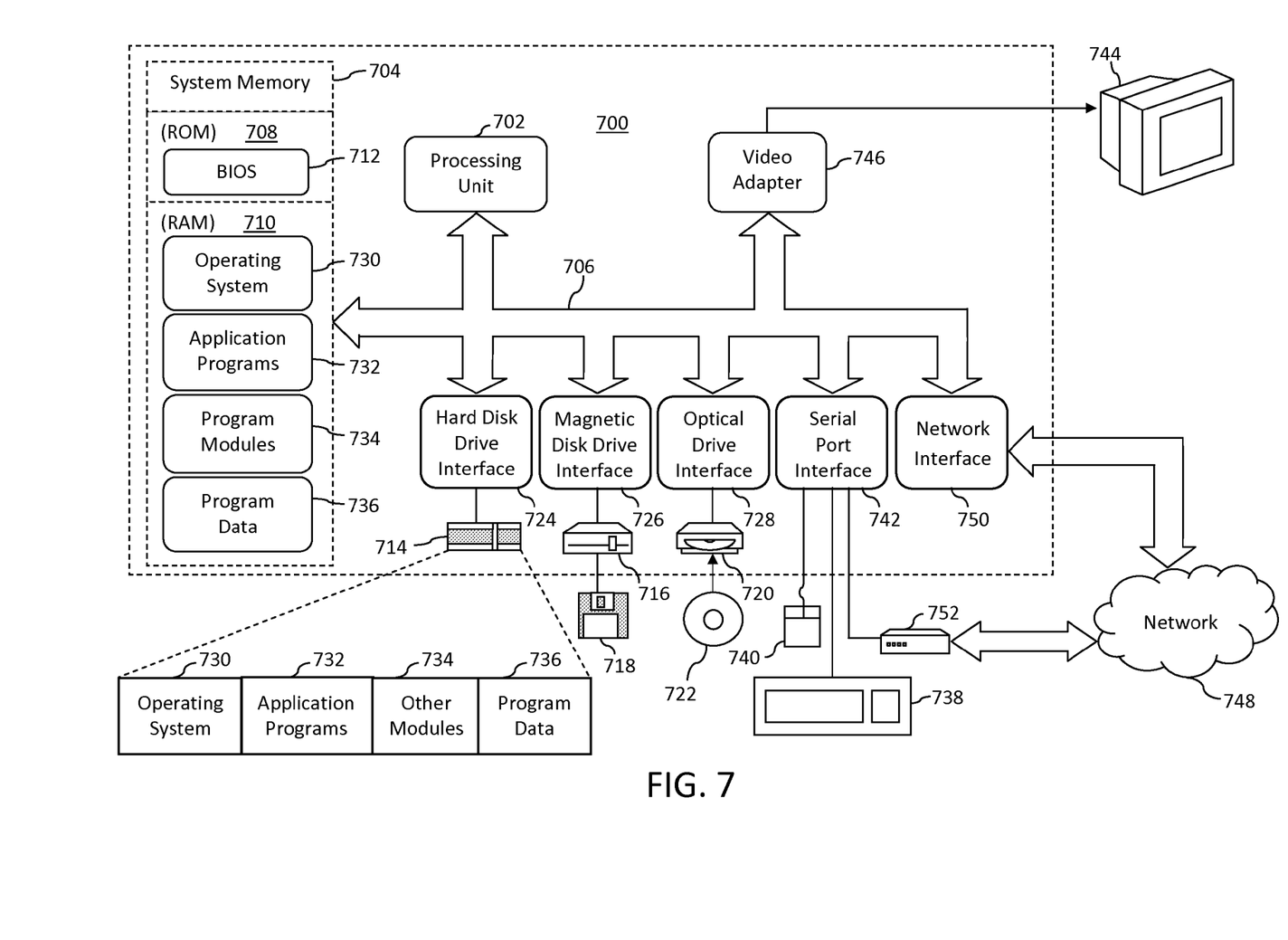
FIG. 7 depicts an example computer in which embodiments may be implemented.

FIG. 7 depicts an example computer 700 in which embodiments may be implemented. Any one or more of the user systems 102A-102M or any one or more of servers 106A-106N shown in FIG. 1 (or any one or more subcomponents thereof shown in FIG. 4) may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing information recommendation module 112, social networking module 114, operation determination logic 402, information determination logic 404, recommendation logic 406, filter logic 408, test logic 410, user addition logic 412, store 414, social data graph 416, review logic 602, indicator determination logic 604, contextual relation logic 608, flowchart 300 (including any step of flowchart 300), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable medium" are used to generally refer to media such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method performed using one or more processors of a processor-based system, the method comprising:
   determining, by at least one of the one or more processors, that a developer performs an operation with regard to development of designated code;
   filtering, by at least one of the one or more processors, a plurality of social updates that are associated with a plurality of users in a social networking environment in a social data graph to determine a subset of the plurality of social updates that relates to development of software applications;
   determining, by at least one of the one or more processors, information that is contextually related to the designated code based on the subset of the plurality of social updates in response to a determination that the developer performs the operation with regard to the development of the designated code, the information being associated with the plurality of users; and
   recommending, by at least one of the one or more processors, at least a portion of the information for use with regard to the designated code based on at least the portion of the information being associated with at least one user of the plurality of users who is included in a social network of the developer in the social data graph.

2. The method of claim 1, wherein determining that the developer performs the operation with regard to the development of the designated code comprises:
   determining that the developer acquires ownership of the designated code.

3. The method of claim 1, wherein determining that the developer performs the operation with regard to the development of the designated code comprises:
   determining that the developer checks-in to the designated code.

4. The method of claim 1, further comprising:
   adding, by at least one of the one or more processors, a previous owner of the designated code to the social network of the developer in response to determining that the developer performs the operation with regard to the development of the designated code.

5. The method of claim 1, further comprising:
   adding, by at least one of the one or more processors, at least one user who previously checked-in to the designated code to the social network of the developer in response to determining that the developer performs the operation with regard to the development of the designated code.

6. The method of claim 1, comprising:
   recommending, by at least one of the one or more processors, at least one code snippet to the developer based on at least one of a preference or one or more demographic characteristics of the developer.

7. A system comprising:
   one or more processors;
   operation determination logic, implemented using at least one of the one or more processors, configured to determine whether a developer performs an operation with regard to development of designated code;
   filter logic, implemented using at least one of the one or more processors, configured to filter a plurality of social updates that are associated with a plurality of users in a social networking environment in a social data graph to determine a subset of the plurality of social updates that relates to development of software applications;
   information determination logic, implemented using at least one of the one or more processors, configured to determine information that is contextually related to the designated code based on the subset of the plurality of social updates in response to a determination that the developer performs the operation with regard to the development of the designated code, the information being associated with the plurality of users; and
   recommendation logic, implemented using at least one of the one or more processors, configured to recommend at least a portion of the information for use with regard to the designated code based on at least the portion of the information being associated with at least one user of the plurality of users who is included in a social network of the developer in the social data graph.

8. The system of claim 7, wherein the information includes one or more code snippets of a plurality of code snippets that are contextually related to the designated code;
   wherein the plurality of code snippets is associated with the plurality of users in the social networking environment in the social data graph; and
   wherein the recommendation logic is configured to recommend at least one code snippet of the one or more code snippets for inclusion in the designated code based on the at least one code snippet of the one or more code snippets being associated with the at least one user of the plurality of users who is included in the social network of the developer in the social data graph.

9. The system of claim 8, wherein the recommendation logic is configured to recommend a specified code snippet for inclusion in the designated code further based on at least one skill of a user who provides the specified code snippet.

10. The system of claim 8, wherein the recommendation logic is configured to recommend a specified code snippet for inclusion in the designated code further based on a reputation of a user who provides the specified code snippet in the social network of the developer.

11. The system of claim 8, wherein the recommendation logic is configured to recommend a specified code snippet for inclusion in the designated code further based on a number of bugs that are discovered in the specified code snippet.

12. The system of claim 11, wherein the recommendation logic is configured to recommend that an identified code snippet not be included in the designated code based on a number of bugs that are discovered in the identified code snippet reaching a threshold.

13. The system of claim 8, wherein the recommendation logic is configured to recommend a specified code snippet for inclusion in the designated code further based on a number of instances of the specified code snippet that are retrieved by users.

14. The system of claim 8, wherein the recommendation logic is configured to recommend a specified code snippet for inclusion in the designated code further based on user feedback from one or more users who retrieve the specified code snippet.

15. The system of claim 8, wherein the recommendation logic is configured to recommend a specified code snippet for inclusion in the designated code further based on retrieval of the specified code snippet by one or more users in the social network of the developer.

16. The system of claim 8, further comprising:
   test logic, implemented using at least one of the one or more processors, configured to perform one or more tests with regard to the at least one code snippet of the one or more code snippets to generate performance information that describes performance of the at least one code snippet of the one or more code snippets with regard to the one or more tests;

wherein the recommendation logic is configured to recommend the at least one code snippet of the one or more code snippets for inclusion in the designated code further based on the performance information.

17. The system of claim 8, wherein the recommendation logic is configured to recommend at least one additional code snippet to the developer in response to retrieval of the at least one additional code snippet by one or more users in the social network of the developer.

18. A computer program product comprising a computer-readable storage medium having computer program logic modules recorded thereon, the computer program logic modules configured to enable a processor-based system to recommend at least one code snippet for inclusion in designated code, the computer program product comprising:
   a first computer program logic module configured to enable the processor-based system to determine that a developer performs an operation with regard to development of the designated code;
   a second computer program logic module configured to enable the processor-based system to filter a plurality of social updates that are associated with a plurality of users in a social networking environment in a social data graph to determine a subset of the plurality of social updates that relates to development of software applications;
   a third computer program logic module configured to enable the processor-based system to determine one or more code snippets of a plurality of code snippets that are contextually related to the designated code based on the subset of the plurality of social updates in response to a determination that the developer performs the operation with regard to the development of the designated code, the plurality of code snippets being associated with the plurality of users; and
   a fourth computer program logic module configured to enable the processor-based system to recommend at least one code snippet of the one or more code snippets for inclusion in the designated code based on the at least one code snippet of the one or more code snippets being associated with at least one user of the plurality of users who is included in a social network of the developer in the social data graph.

19. The computer program product of claim 18, wherein the third computer program logic module comprises:
   logic configured to enable the processor-based system to review a recordation of a communication between the developer and at least one person to determine an issue to be resolved with regard to the designated code; and
   wherein the fourth computer program logic module comprises:
   logic configured to enable the processor-based system to recommend a specified code snippet for inclusion in the designated code further based on an indicator in the social data graph indicating that the specified code snippet addresses the issue.

20. The computer program product of claim 18, wherein the fourth computer program logic module comprises:
   logic configured to enable the processor-based system to recommend a specified code snippet for inclusion in the designated code further based on a history of at least one of the specified code snippet or the designated code.

* * * * *